(12) United States Patent
Lee

(10) Patent No.: US 12,388,242 B2
(45) Date of Patent: Aug. 12, 2025

(54) GROUNDING DEVICE FOR CIRCUIT BREAKER

(71) Applicant: LS ELECTRIC CO., LTD., Anyang-si (KR)

(72) Inventor: Juhyung Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 216 days.

(21) Appl. No.: 18/037,261

(22) PCT Filed: Oct. 27, 2021

(86) PCT No.: PCT/KR2021/015171
§ 371 (c)(1),
(2) Date: May 16, 2023

(87) PCT Pub. No.: WO2022/108159
PCT Pub. Date: May 27, 2022

(65) Prior Publication Data
US 2023/0420923 A1     Dec. 28, 2023

(30) Foreign Application Priority Data
Nov. 17, 2020   (KR) .......................... 10-2020-0153854

(51) Int. Cl.
*H02B 11/28*    (2006.01)
*H02B 11/127*   (2006.01)

(52) U.S. Cl.
CPC ........... *H02B 11/28* (2013.01); *H02B 11/127* (2013.01)

(58) Field of Classification Search
CPC ..... H02B 11/28; H02B 11/127; H02B 11/167; H02B 11/133; H02B 11/173; H02B 11/22; H02B 1/26
(Continued)

(56) References Cited

U.S. PATENT DOCUMENTS 8,491,159 B2 * 7/2013 Recker ................. H05B 45/357
                                               362/276
9,742,164 B2 * 8/2017 Gan ..................... H02B 11/127
(Continued)

FOREIGN PATENT DOCUMENTS

CN    208190103 U    12/2018
GB      2138635   * 10/1984 ............. H02B 11/16
(Continued)

OTHER PUBLICATIONS

Translation of CN208190103 (Original document published Dec. 4, 2018) (Year: 2018).*
(Continued)

*Primary Examiner* — William A Bolton
(74) *Attorney, Agent, or Firm* — K&L Gates LLP

(57) ABSTRACT

The present disclosure relates to a grounding device for a circuit breaker, and more specifically, to a circuit breaker having a grounding device which selectively operates according to a truck. The grounding device for a circuit breaker according to an aspect of the present invention comprises: a housing installed in a distribution box or an external box; and a fixed contactor fixed to a ground truck inserted into/withdrawn from the distribution box or the external box; a moving assembly rotatably installed in the housing; a movable contactor which is coupled to and moves together with the moving assembly, and of which one end is connected to ground and the other end is connected to or separated from the fixed contactor; and a stopper assembly which is rotatably installed in the housing and restricts or allows the operation of the moving assembly.

20 Claims, 12 Drawing Sheets

(58) Field of Classification Search
USPC .......................................... 200/50.21–50.25
See application file for complete search history.

(56) References Cited

U.S. PATENT DOCUMENTS

| | | | | |
|---|---|---|---|---|
| 9,825,439 | B2* | 11/2017 | Yang | ...................... H01H 33/46 |
| 10,153,625 | B2* | 12/2018 | Lee | ........................ H01H 33/46 |
| 2010/0208416 | A1 | 8/2010 | Shoda et al. | |
| 2016/0164267 | A1* | 6/2016 | Kim | ........................ E05C 9/043 |
| | | | | 200/50.23 |
| 2016/0308335 | A1* | 10/2016 | Park | ..................... H01H 33/666 |
| 2017/0237241 | A1* | 8/2017 | Benke | ....................... G06F 1/16 |
| | | | | 200/50.23 |

FOREIGN PATENT DOCUMENTS

| | | |
|---|---|---|
| JP | S5699733 U | 8/1981 |
| JP | H04275005 A | 9/1992 |
| JP | H0584110 U | 11/1993 |
| JP | 2011078273 A | 4/2011 |
| KR | 20030013171 A | 2/2003 |
| KR | 100692503 B1 | 3/2007 |
| KR | 20150089790 A | 8/2015 |
| KR | 20180029516 A | 3/2018 |
| WO | 2014106912 A1 | 7/2014 |

OTHER PUBLICATIONS

Translation of KR20180029516 (Original document published Mar. 21, 2018) (Year: 2018).*
International Search Report for related International Application No. PCT/KR2021/015171; action dated May 27, 2022; (5 pages).
Written Opinion for related International Application No. PCT/KR2021/015171; action dated May 27, 2022; (3 pages).
Notice of Allowance for related Korean Application No. 10-2020-0153854; action dated Mar. 24, 2022; (2 pages).
Extended European Search Report for related European Application No. 21894930.3; action dated Sep. 2, 2024; (11 pages).

* cited by examiner

GROUNDING DEVICE FOR CIRCUIT BREAKER

CROSS-REFERENCE TO RELATED APPLICATIONS

This application is the National Stage filing under 35 U.S.C. 371 of International Application No. PCT/KR2021/015171, filed on Oct. 27, 2021, which claims the benefit of earlier filing date and right of priority to Korea utility model Application No. 10-2020-0153854 filed on Nov. 17, 2020, the contents of which are all hereby incorporated by reference herein in their entirety.

FIELD

The present disclosure relates to a grounding device for a circuit breaker, and more particularly, to a circuit breaker having a grounding device that selectively operates according to a moving truck.

BACKGROUND

In general, a circuit breaker is an electrical apparatus that is installed on a portion of a line and automatically cuts off a circuit when an overcurrent or fault current occurs in the circuit, to protect the circuit and a load.

Among other circuit breakers, a vacuum circuit breaker is configured such that a vacuum interrupter (VI) disposed in the circuit breaker breaks a circuit using vacuum as extinguishing medium through an external relay, when a fault current, such as overcurrent, short-circuit, ground fault, occurs in extra-high/high-voltage distribution lines.

This vacuum circuit breaker is typically installed in a switchboard in which various electrical devices are received and managed for operations or controls of power plants and substations, operations of a motor, and the like. Specifically, a circuit breaker main body is generally installed in a cradle that is fixed to the switchboard.

On the other hand, for maintenance of electrical equipment, a line must first be cut off and a residual current remaining in the line must be removed. At this time, earthing switches or ground and test devices are used.

The earthing switch and the grounding device are identical in that they both have a grounding function. However, the earthing switch and the grounding device are different in that the earthing switch is fixedly installed on a cradle or enclosure to perform its function, while the grounding device is a movable device separately disposed in a vacuum circuit breaker to be drawn into/out of the inside of the enclosure. In particular, the grounding device is usually used by being coupled to a truck (moving truck, moving cart), and a connection between the line and the ground must be firmly maintained during the process of drawing the grounding device into/out of the inside of the enclosure, and compatibility with the vacuum circuit breaker is also important.

FIGS. 1 to 4 illustrate a grounding device according to the related art. FIG. 1 is a perspective view of a grounding device according to the related art, and FIG. 2 is a lateral view illustrating a state in which the grounding device is drawn into a switchboard.

FIGS. 3 and 4 are a top perspective view and a bottom perspective view illustrating a state in which the grounding device is installed on a truck.

A grounding device 1 according to the related art includes a fixing bracket 2 for supporting components and fixing them to a truck 8, a first terminal 3 connected to a line, and a second terminal 4 connected to a grounding bus bar 7. The grounding bus bar 7 to which the grounding device 1 is to be connected is fixedly installed in a distribution box or enclosure (not illustrated). The grounding device 1 moves between a test position and a service position together with the truck 8, and at this time, the movement must be smooth and a contact state must also be stably maintained even during the movement. Therefore, a clip 5 is installed between the second terminal 4 and the grounding bus bar 7. That is, the second terminal 4 is connected to the grounding bus bar 7 through the clip 5. In addition, contact pressure is applied to the clip 5 by a contact spring 6 such that the contact (connection) is maintained in a ground state without any problems even by a repulsive force due to a fault current.

On the other hand, since the grounding device 1 is used by being fixed to the truck 8, a frame of the truck 8 needs an avoidance design for avoiding interference with the grounding bus bar 7 installed in the cradle, the distribution box, or the enclosure.

An avoidance hole 9-1 is formed in a lower surface 9 of the truck 8 to prevent collision with the grounding bus bar 7 when the truck 8 is drawn into and out of the distribution box.

However, the grounding device according to the related art has a structure that employs a contact method between terminals and is easy to be used at a low breaking current, but has a problem that sufficient contact pressure cannot be maintained in a system using a high breaking current. That is, the contact pressure by the clip is low.

There is also a disadvantage in that such a wide avoidance hole 9-1 is required in the truck 8 since the grounding device 1 must be compatible with various types of circuit breakers in a cradle or enclosure.

In addition, since the grounding device 1 occupies a considerable space in the truck 8, there is a disadvantage in that other accessories cannot be additionally installed.

SUMMARY

The present disclosure has been devised to solve those problems, and one aspect of the present disclosure is to provide a grounding device having improved contact pressure so as to be endurable even to a high breaking current.

Another aspect of the present disclosure is to provide a grounding device capable of reducing a size of an avoidance hole for preventing interference among a grounding bus bar, the grounding device, and a ground truck.

Still another aspect of the present disclosure is to provide a grounding device capable of reducing a space occupied thereby in a ground truck.

Still another aspect of the present disclosure is to provide a grounding device capable of selectively operating a moving truck for a circuit breaker and a ground truck in an automatic manner.

A grounding device for a circuit breaker in accordance with one aspect of the present disclosure may include a housing installed in a distribution box or an enclosure, a fixed contactor fixed to a ground truck that is drawn into and out of the distribution box or the enclosure, a moving assembly rotatably installed on the housing, a movable contactor coupled to the moving assembly to move together, and having one end connected to ground and another end connected to or separated from the fixed contactor, and a stopper assembly rotatably installed on the housing to restrict or allow an operation of the moving assembly.

Here, the ground truck may include on a lower surface thereof a mover entry hole having a length from a rear end to a middle portion in a front and rear direction, and an operation prevention hole formed parallel to the mover entry hole.

The mover entry hole may be arranged to correspond to a position of the fixed contactor in a perpendicular direction when the ground truck enters an inside of the distribution box, and the operation prevention hole may be arranged to correspond to positions of the stopper assembly and the moving assembly in the perpendicular direction when the ground truck enters the inside of the distribution box.

The ground truck may include a ground body and a moving truck that is movable while loading the ground body, and the fixed contactor may be installed on the ground body or the moving truck.

The fixed contactor may include a holder fixedly installed on the ground truck, a plurality of contactors arranged in two rows on the holder with a predetermined gap therebetween, and a stator clip supporting the plurality of contactors in a surrounding manner.

The grounding device may further include a fixing bracket which is fixed to the distribution box or enclosure and to which the housing is coupled.

The fixing bracket may include a first operation hole through which the moving assembly is movable, and a second operation hole through which the stopper assembly is movable.

The fixing bracket may further include a third operation hole through which the movable contactor is movable.

The housing may include a fourth operation hole and a fifth operation hole formed through a central surface thereof to communicate with the first operation hole and the second operation hole.

The grounding device may further include a support plate coupled to a side surface of the housing to support the moving assembly and the stopper assembly.

The moving assembly may include a moving plate, a first shaft coupled through the moving plate, and a first lever formed on a portion of the moving plate and protruding to a top of the fixing bracket through the first operation hole.

The moving assembly may further include a fixing plate which is provided on one side of the first shaft and to which the movable contactor is coupled.

A first roller may be disposed on an end portion of the first lever.

A landing portion with which the stopper assembly is contactable may be formed on a lower end of the moving plate.

The stopper assembly may include a stopper plate, a second shaft coupled through the stopper plate, and a second lever formed on a portion of the stopper plate and protruding from a top of the fixing bracket through the second operation hole.

A second roller may be disposed on an end portion of the second lever.

A pressing portion which is to be brought into contact with the moving assembly may be formed on a lower end of the stopper plate.

The grounding device may further include a first return spring having one end supported by a first spring fixing portion formed on the first shaft and another end supported by a second spring supporting portion formed on the stopper plate.

The grounding device may further include a second return spring having one end supported by a second spring fixing portion formed on the second shaft and another end supported by a first spring supporting portion formed on the first lever.

The movable contactor may be connected to the ground by a flexible connection line.

A grounding device for a circuit breaker in accordance with another aspect of the present disclosure may include a stator assembly installed on a ground truck, and a mover assembly installed on a distribution box or an enclosure to be brought into contact with the stator assembly, and the mover assembly may include a housing installed on the distribution box or the enclosure, a moving assembly rotatably installed on the housing, a movable contactor coupled to the moving assembly to move together, and having one end connected to ground and another end connected to or separated from the stator assembly, and a stopper assembly rotatably installed on the housing to restrict or permit an operation of the moving assembly.

According to a grounding device for a circuit breaker according to one embodiment of the present disclosure, a connection of a ground line is made by a contact between a movable contactor and a fixed contactor, which can improve contact pressure to endure a high breaking current.

A ground truck merely has an operating hole for avoiding a lever or roller of the grounding device, which can reduce a size of an avoidance hole.

A main part of the grounding device is not installed on the ground truck, but is installed on a distribution box or enclosure, thereby reducing a space occupied by the ground truck.

Connection and disconnection of the ground line is automatically performed according to the moving truck for the circuit breaker and the ground truck that are drawn in and out of the distribution box.

BRIEF DESCRIPTION OF THE DRAWINGS

FIGS. 11 and 12 are views illustrating operations of the grounding device for the circuit breaker according to the one embodiment of the present disclosure, wherein FIG. 11 illustrates a state in which the moving truck for the grounding device is drawn inward, and FIG. 12 illustrates a state in which the moving truck for the circuit breaker is drawn inward.

DETAILED DESCRIPTION

Hereinafter, preferred embodiments of the present disclosure will be described with reference to the accompanying drawings, so that a person skilled in the art can easily carry out the disclosure. It should be understood that the technical idea and scope of the present disclosure are not limited to those preferred embodiments.

Figure 1:
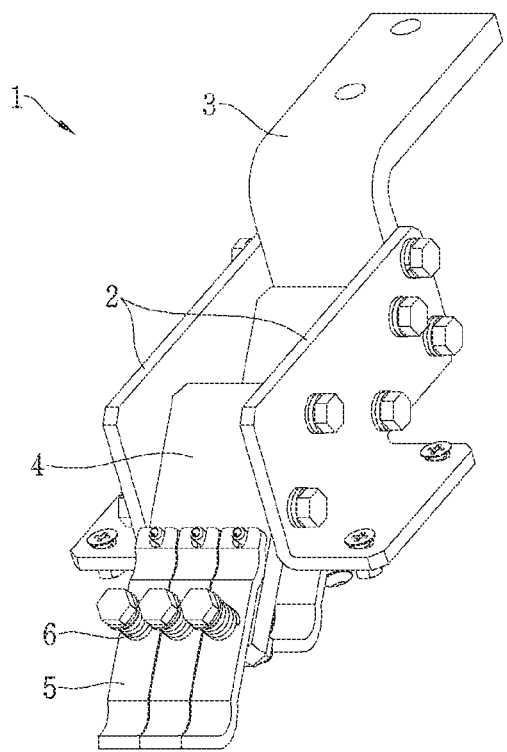
FIG. 1 is a perspective view illustrating the related art grounding device.
Figure 2:
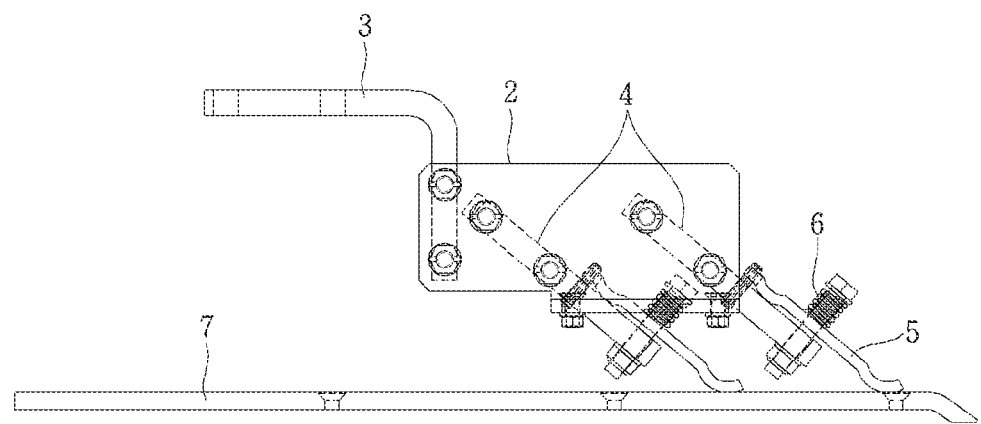
FIG. 2 is a lateral view illustrating a state in which the grounding device of FIG. 1 is drawn into a switchboard.
Figure 3:
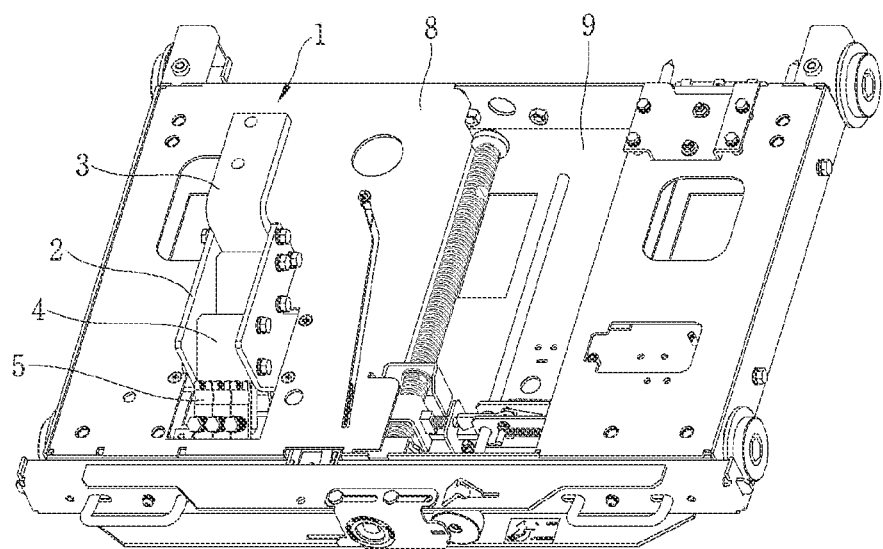
FIGS. 3 and 4 are a top perspective view and a bottom perspective view illustrating a state in which the grounding device of FIG. 1 is installed on a moving truck.
Figure 4:
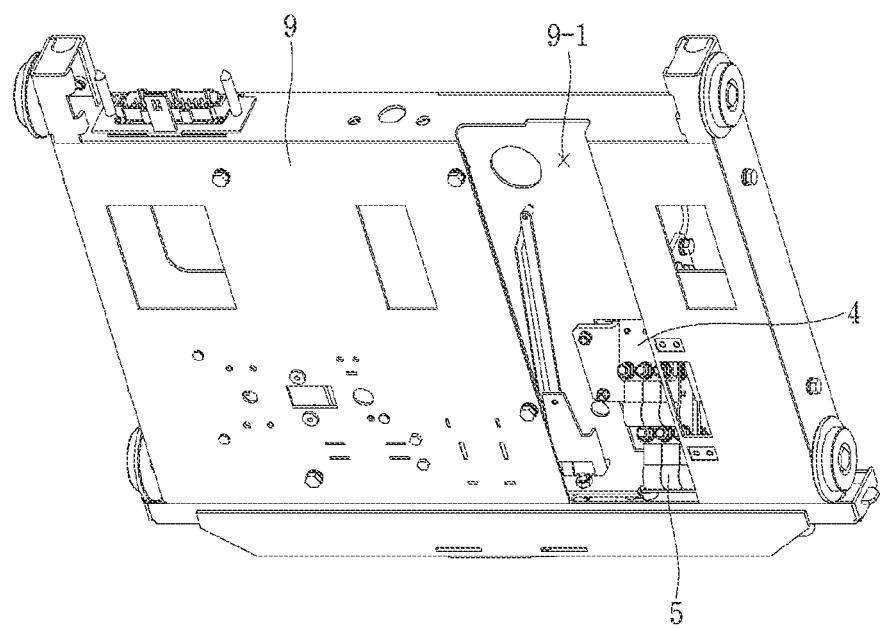
Figure 5:
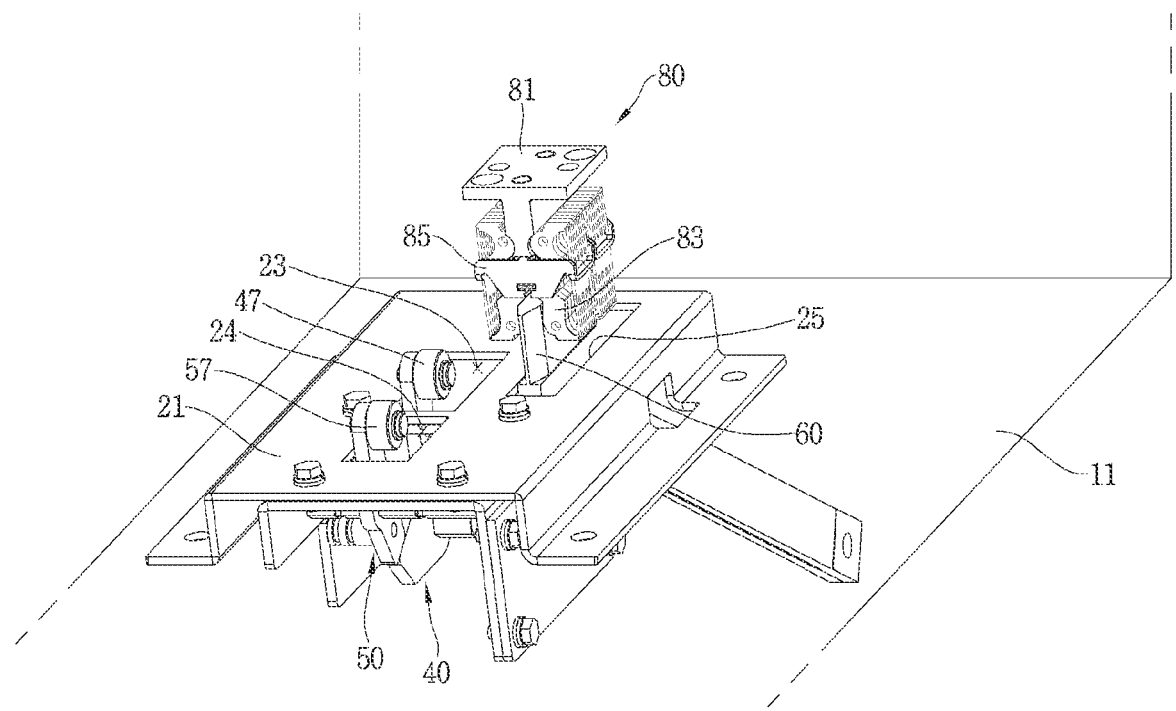
FIG. 5 is a perspective view illustrating a state in which a grounding device for a circuit breaker according to one embodiment of the present disclosure is disposed in a switchboard.
Figure 6:
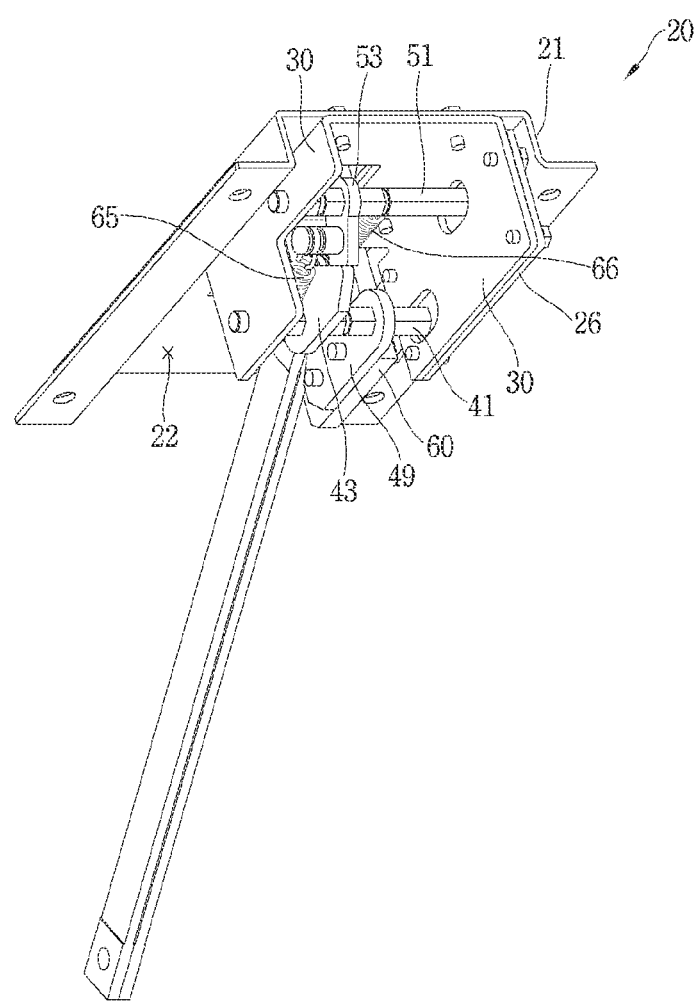
FIG. 6 is a perspective view illustrating the grounding device of FIG. 5.
Figure 7:
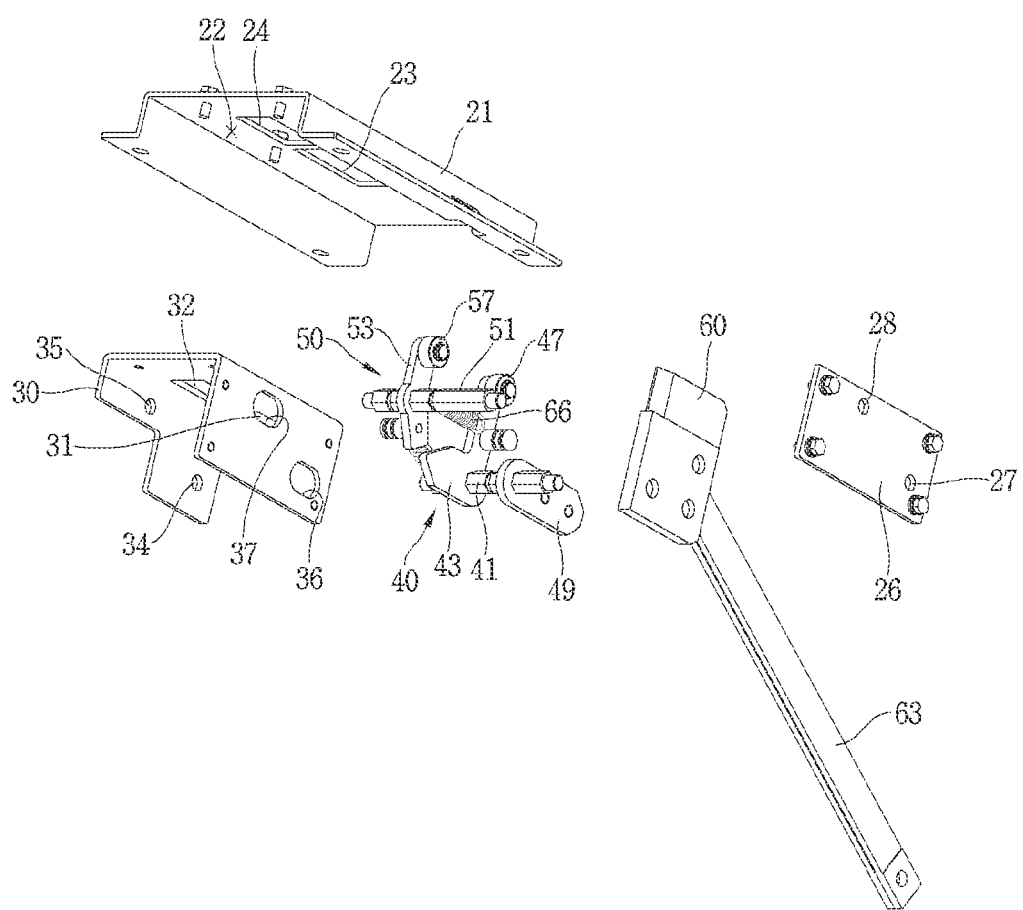
FIG. 7 is an exploded perspective view of FIG. 6.
Figure 8:
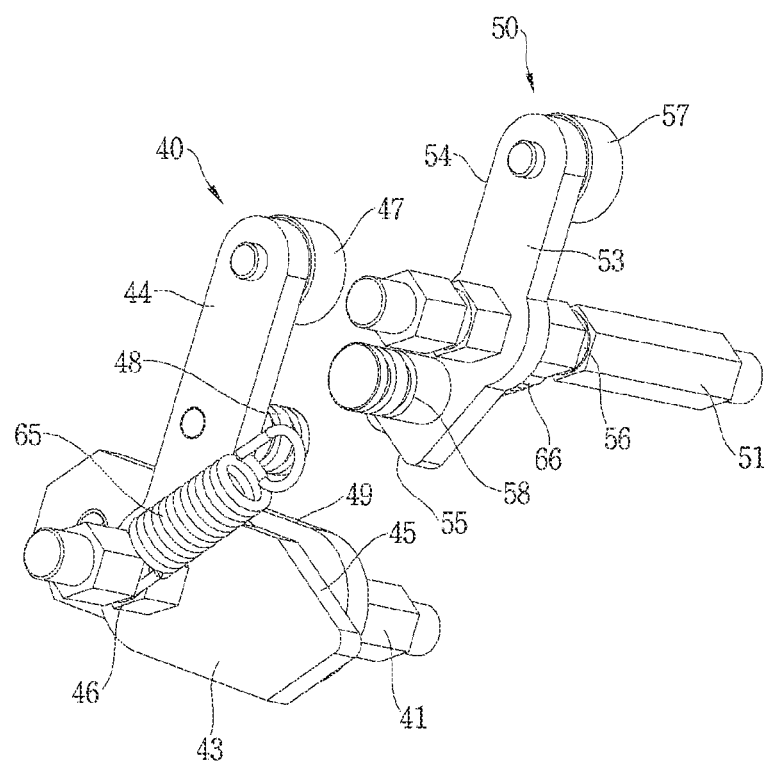
FIG. 8 is a perspective view illustrating a moving assembly and a stopper assembly of FIG. 7 viewed from different viewpoints.
Figure 9:
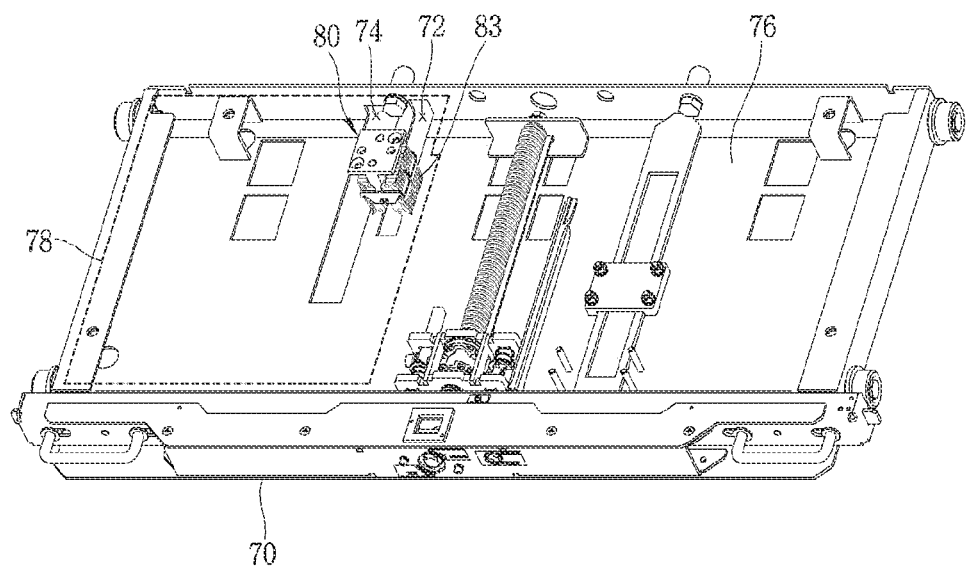
FIGS. 9 and 10 are a top perspective view and a bottom perspective view illustrating a moving truck to which a ground truck of FIG. 5 is applied.
Figure 10:
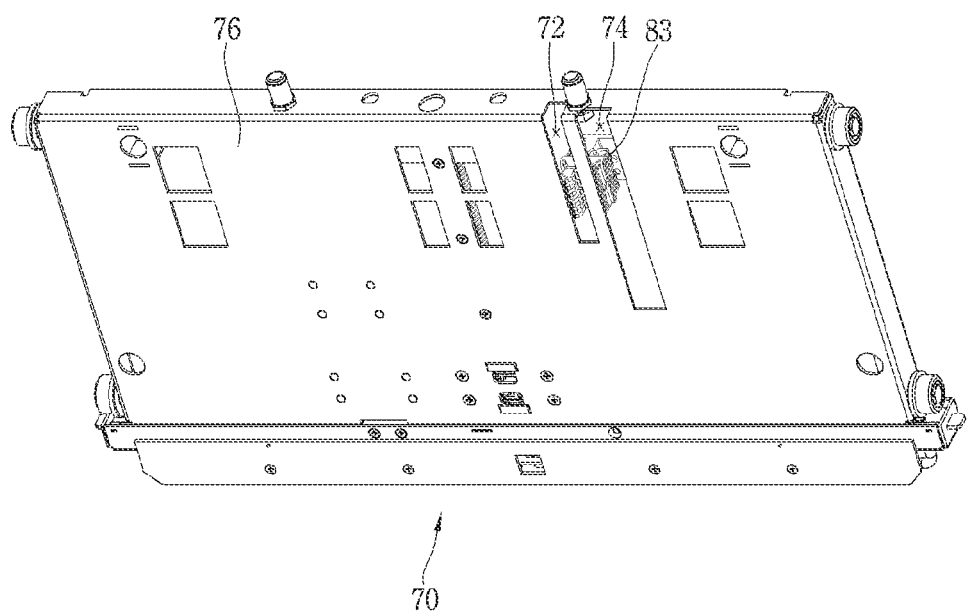

Hereinafter, a grounding device for a circuit breaker in accordance with each embodiment of the present disclosure will be described in detail with reference to the accompanying drawings. FIG. 5 is a perspective view illustrating a state in which a grounding device for a circuit breaker according to one embodiment of the present disclosure is disposed in a switchboard, FIG. 6 is a perspective view illustrating the grounding device of FIG. 5, and FIG. 7 is an exploded perspective view of FIG. 6. FIG. 8 is a perspective view illustrating a moving assembly and a stopper assembly of FIG. 7 viewed from different viewpoints, and FIGS. 9 and 10 are a top perspective view and a bottom perspective view illustrating a moving truck to which a ground truck of FIG. 5 is applied.

A grounding device for a circuit breaker according to an embodiment of the present disclosure includes a housing 30 installed in a portion of a distribution box 11 or a cradle, a fixed contactor 80 fixed to a ground truck 70, 90 drawn into/out of the distribution box 11, a moving assembly 40 rotatably installed on the housing 30, a movable contactor 60 coupled to the moving assembly 40 and having one end connected to a ground and another end connected to or separated from the fixed contactor 80, and a stopper assembly 50 rotatably installed on the housing 30 to restrict or allow an operation of the moving assembly 40.

In the grounding device for the circuit breaker according to the one embodiment of the present disclosure, a stator assembly part and a mover assembly part are separately installed. The stator assembly part is installed on the ground truck 70, 90, and the mover assembly part is installed on the distribution box 11 or an enclosure (here, the enclosure refers to a cradle, a grounding box, or a grounding chamber). The stator assembly part may simply include the fixed contactor 80.

First, a ground and test truck (hereinafter, referred to as a ground truck) 73, 90 will be described. FIGS. 9 to 10 illustrate the ground truck.

The ground truck 70, 90 may include a ground body 90 and a moving truck 70.

Figure 13:
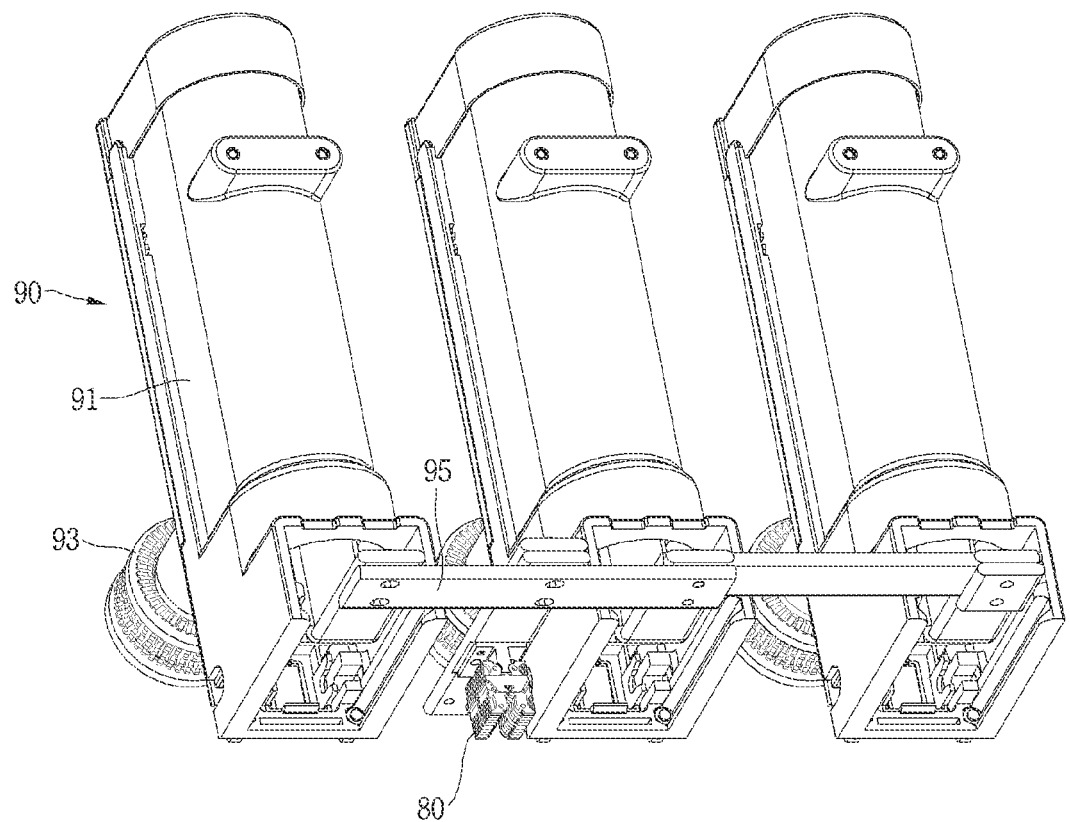
FIG. 13 is a bottom perspective view illustrating a grounding body applied to a grounding device for a circuit breaker according to another embodiment of the present disclosure.

Referring to FIG. 13, the ground body 90 may be configured similarly to a body of a vacuum circuit breaker. At this time, a breaker such as a vacuum interrupter is not provided inside the ground body. The ground body 90 functions as a current connection passage. The ground body 90 may include a body part 91, a terminal part 93 disposed at the rear of the body part 91, and a bus bar part 95 disposed below the body part 91. The bus bar part 95 is connected to the terminal part 93 and is connected to a main circuit when the ground truck 70, 90 drawn into the distribution box 11 or the enclosure. Depending on an embodiment, the fixed contactor 80 may be installed on a portion of the bus bar part 95.

The moving truck 70 may be formed similarly to a truck of a vacuum circuit breaker. The moving truck 90 may carry the ground body 90.

A lower surface 76 of the moving truck 70 is provided with a mover entry hole 72 formed in a length from a rear end to a middle portion, and an operation prevention hole 74 formed parallel to the mover entry hole 72.

The mover entry hole 72 is formed in a shape that the lower surface 76 of the moving truck 70 is partially cut. The mover entry hole 72 is formed in a length from a rear portion to a middle portion of the moving truck 70. The mover entry hole 72 is formed in a movement direction of the moving truck 70, that is, in a front-rear direction. The mover entry hole 72 is disposed to correspond to a position of the fixed contactor 80 when the moving truck 70 enters the inside of the distribution box 11. When the moving truck 70 enters the distribution box 11 or the cradle, the movable contactor 60 is inserted through the mover entry hole 72. The movable contactor 60 is inserted into the fixed contactor 80 to be in contact with the fixed contactor 80.

The operation prevention hole 74 is formed in a shape that the lower surface of the moving truck 70 is partially cut. The operation prevention hole 74 is formed in a length from a rear portion to a middle portion of the moving truck 70. The operation prevention hole 74 is formed next to the mover entry hole 72 to be in parallel to the mover entry hole 72. The operation prevention hole 74 is formed in a movement direction of the moving truck 70, that is, in the front-rear direction. The operation prevention hole 74 is placed at positions of the stopper assembly 50 and the moving assembly 40 in a perpendicular direction when the moving truck 70 enters the inside of the distribution box 11. That is, the stopper assembly 50 and the moving assembly 40 are inserted into the operation prevention hole 74 and remain stationary without movement. Therefore, the movable contactor 60 is in a fixed state and is inserted into the fixed contactor 80.

The stator assembly part, that is, the fixed contactor 80 is installed on the moving truck 70. That is, the fixed contactor 80 is installed on the ground body 90 or the moving truck 70.

For example, the fixed contactor 80 is installed on an upper surface 78 of the moving truck 70 (see FIG. 9). The fixed contactor 80 is installed on the moving truck 70 to be brought into contact with the movable contactor 60. Accordingly, the ground is connected and a current remaining in a circuit of the distribution box 11 is discharged. The fixed contactor 80 is connected to the line.

As another example, the fixed contactor 80 is installed on the ground body 90. Referring to FIG. 13, the fixed contactor 80 may be installed on the bus bar part 95 beneath the ground body 90.

The fixed contactor 80 may be formed in various shapes according to embodiments. As an example, referring to FIG. 5, the fixed contactor 80 applied to this embodiment may include a holder 81 formed in a shape like "T" fixedly installed on the upper surface 78 of the moving truck 70, a plurality of contactors 83 arranged in two rows with a gap therebetween on the holder 81, and a stator clip 85 surrounding and supporting the plurality of contactors 83. The plurality of contactors 83 arranged in the two rows face each other with a predetermined gap, so that the movable contactor 60 is coupled by engagement between the plurality of contactors 83. That is, the movable contactor 60 receives contact pressure by the plurality of contactors 83. That is, since the grounding connection of the grounding device according to the one embodiment of the present disclosure is made by a contact between the fixed contactor 80 and the movable contactor 60, contact pressure can be provided sufficiently. Therefore, it may be applicable even to a high voltage device as well as a low voltage device.

Hereinafter, the mover assembly part installed on the distribution box 11, the enclosure, or the cradle will be described.

The mover assembly 20 is installed on a bottom surface of the distribution box 11 (a surface on which the moving truck or the ground truck moves while being in contact).

The mover assembly 20 includes a fixing bracket 21 disposed on a portion of the distribution box 11, a housing 30 fixed to the fixing bracket 21, a moving assembly 40 rotatably installed on the housing 30, a movable contactor 60 coupled to the moving assembly 40 and having one end connected to the ground, and a stopper assembly 50 restricting or allowing the operation of the moving assembly 40.

The fixing bracket 21 has an accommodating portion 22 to accommodate members of the mover assembly 20. For example, the fixing bracket 21 may be formed in a '⊏' shape.

The fixing bracket 21 includes a first operation hole 23 through which the moving assembly 40 is movable, and a second operation hole 24 through which the stopper assembly 50 is movable. The moving assembly 40 is partially exposed through the first operation hole 23 and the stopper assembly 50 is partially exposed through the second operation hole 24. That is, in a normal state, the stopper assembly 50 and the moving assembly 40 protrude above an upper surface of the fixing bracket 21. The first operation hole 23 and the second operation hole 24 may be connected into a single hole.

The fixing bracket 21 includes a third operation hole 25 through which the movable contactor 60 is movable.

A housing 30 is provided. The housing 30 is provided to install the stopper assembly 50 and the moving assembly 40 thereon. The housing 21 may be formed in a '⊏' shape. The housing 30 is seated in the accommodating portion 22 of the fixing bracket 21.

A fourth operation hole 31 and a fifth operation hole 32 are formed through a central surface of the housing 30 to communicate with the first operation hole 23 and the second operation hole 24.

The housing 30 includes a first shaft hole 34 and a second shaft hole 35 formed through one side surface thereof to support a first rotational shaft 41 of the moving assembly 40 and a second rotational shaft 51 of the stopper assembly 50, respectively.

The housing 30 also includes a first through hole 36 and a second through hole 37 formed through another side surface thereof, such that the first rotational shaft 41 of the moving assembly 40 and the second rotational shaft 51 of the stopper assembly 50 are inserted therethrough, respectively.

A support plate 26 coupled to the another side surface of the housing 30 is provided. The support plate 26 includes a third shaft hole 27 and a fourth shaft hole 28 formed therethrough to support the first rotational shaft 41 of the moving assembly 40 and the second rotational shaft 51 of the stopper assembly 50.

A moving assembly 40 is provided. The moving assembly 40 is provided to selectively move the movable contactor 60 according to a type of moving truck. Detailed drawings of the moving assembly 40 may refer to FIGS. 7 and 8.

The moving assembly 40 is provided with a first shaft 41 acting as a rotational shaft. Both ends of the first shaft 41 are supported by the first shaft hole 34 and the third shaft hole 27, respectively.

The first shaft 43 is coupled to the moving plate 43. The moving plate 43 may be formed in a 'ㄴ' shape. A first lever 44 is provided on one end (upper end) of the moving plate 43.

The first lever 44 protrudes to the outside (top) of the fixing bracket 21 through the first operation hole 23. When the first lever 44 is pressed, the moving plate 43 rotates centering on the first shaft 41, and the movable contactor 60 coupled to the moving assembly 40 also rotates.

A first roller 47 may be disposed on an end portion of the first lever 44. An impact applied to the first lever 44 is alleviated by the roller 47. The roller 47 is rolled in contact with a rear surface 171 and a lower surface 176 of the moving truck 170, which can make the moving assembly 40 moved smoothly and improve durability of the moving assembly 40.

A first spring supporting portion 48 supporting a second return spring 66 is provided on a lower portion of the first lever 44.

A landing portion 45 with which the stopper assembly 50 can come into contact is formed at another end (lower end) of the moving plate 43. The landing portion 45 may be formed flat.

The first shaft 41 is provided with a fixing plate 49 capable of fixing the movable contactor 60. The movable contactor 60 is fixed to the fixing plate 49 by screwing or the like.

A first spring fixing portion 46 supporting the first return spring 65 is provided on another end of the first shaft 41.

A stopper assembly 50 is provided. The stopper assembly 50 is provided to restrict or allow the movement of the moving assembly 40.

A second shaft 51 acting as a rotational shaft is disposed in the stopper assembly 50. Both ends of the second shaft 51 are supported by the second shaft hole 35 and the fourth shaft hole 28, respectively.

A stopper plate 53 is coupled to the second shaft 51. The stopper plate 53 may be a flat plate in a shape like 'V' forming an obtuse angle. A second lever 54 is provided on one end (upper end) of the stopper plate 53.

The second lever 54 protrudes to the outside (top) of the fixing bracket 21 through the second operation hole 24. When the second lever 54 is pressed, the stopper plate 53 rotates centering on the second shaft 51.

A second roller 57 may be disposed on an end portion of the second lever 54. An impact applied to the second lever 54 is alleviated by the second roller 57. The second roller 57 is rolled in contact with the rear surface 171 and the lower surface 176 of the moving truck 170, which can make the stopper assembly 50 moved smoothly and improve durability of the stopper assembly 40.

A second spring fixing portion 58 supporting a second return spring 66 is provided on the second shaft 51.

A pressing portion 55 that can be brought into contact with the landing portion 45 is formed on another end (lower end) of the stopper plate 53. When the pressing portion 55 is brought into contact with the landing portion 45, the movement of the moving assembly 40 is restricted so that the movable contactor 60 remains in a fixed state.

A second spring supporting portion 56 supporting the first return spring 65 is provided at another end (lower end) of the stopper plate 53.

One end of the first return spring 65 is supported by the first spring fixing portion 46 of the first shaft 41 and another end is supported by the second spring supporting portion 56 of the stopper plate 53.

One end of the second return spring 66 is supported by the second spring fixing portion 58 of the second shaft 51 and another end is supported by the first spring supporting portion 48 of the first lever 44.

The movable contactor 60 is made of a material with good electrical conductivity. The movable contactor 60 is fixedly coupled to the support plate 49 and moves along with the rotation of the moving assembly 40.

The movable contactor 60 is connected to the ground by a flexible connection line 73 such as a braided wire.

Hereinafter, operations of the grounding device for the circuit breaker according to the one embodiment of the present disclosure will be described.

Figure 11:
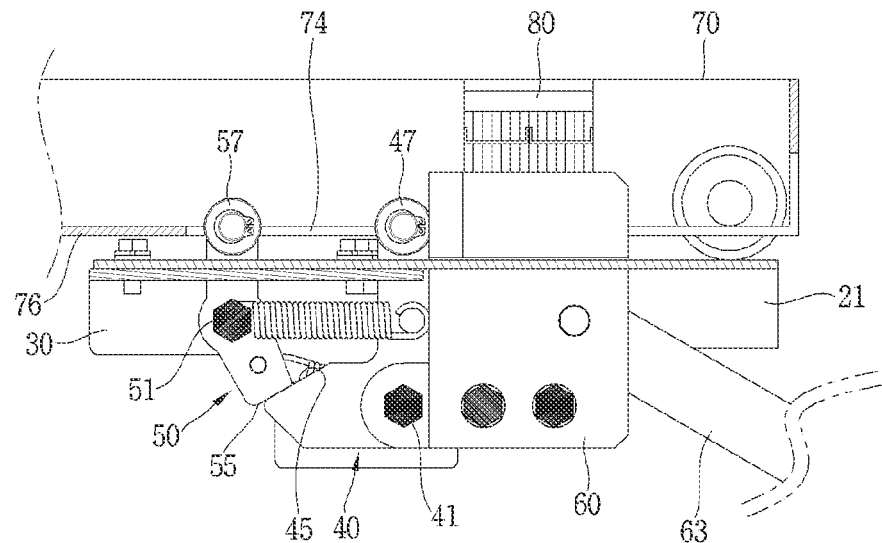

FIG. 11 illustrates a state in which the moving truck 70, on which the grounding device according to the one embodiment is installed, is drawn into the distribution box 11.

Since the moving truck 70 is provided with the mover entry hole 72, it does not interfere with the movable contactor 60 during its movement. In addition, since the moving truck 70 is provided with the operation prevention hole 74, it does not interfere with the movable contactor 60 during its movement. Therefore, the fixed contactor 80 attached to the moving truck 70 is fitted into the movable contactor 60 installed on the distribution box 11, such that a grounding circuit is connected and residual current on the circuit is removed accordingly.

Figure 12:
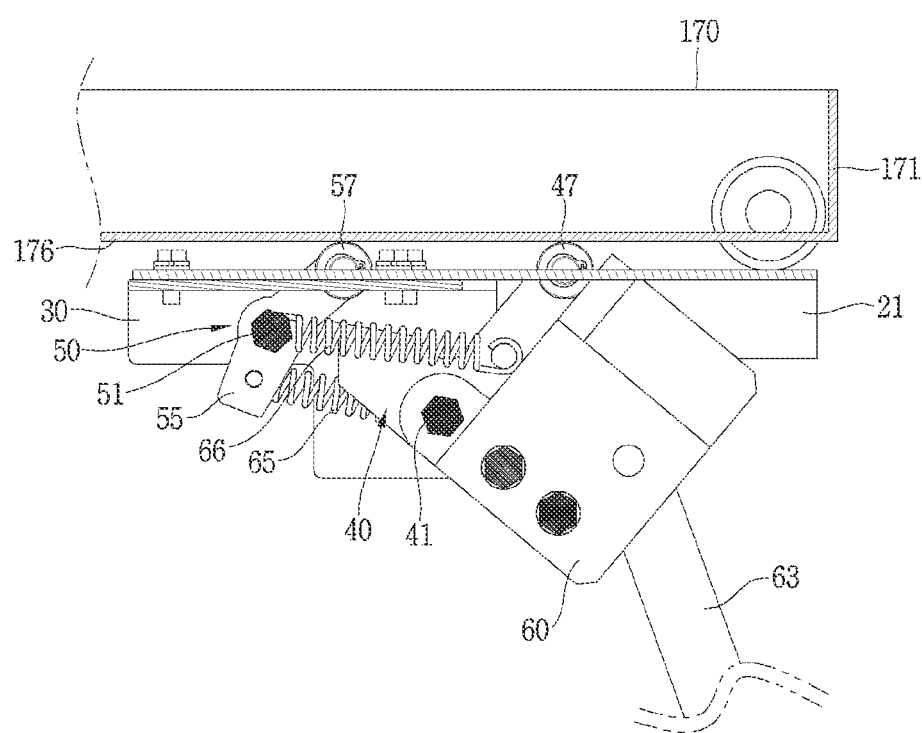

FIG. 12 illustrates a state in which a general moving truck 170 for moving a circuit breaker (hereinafter, referred to as a moving truck for a circuit breaker) is drawn into the distribution box 11. That is, it shows the operation when the circuit breaker (vacuum breaker) is drawn in.

The moving truck 170 for the circuit breaker does not have the mover entry hole 72 or the operation prevention hole 74. Therefore, when the moving truck 170 for the circuit breaker enters, the rear surface 171 of the moving truck 170 for the circuit breaker pushes the second lever 54 or the second roller 57 of the stopper assembly 50 so that the stopper assembly 50 is rotated. Since the pressing portion 55 of the stopper assembly 50 is out of a motion range of the moving assembly 40, the moving assembly 40 can move freely. As the moving truck 170 for the circuit breaker further enters, the first lever 44 or the first roller 47 of the moving assembly 40 is pushed such that the moving assembly 40 is rotated. As the moving assembly 40 is rotated downward, the movable contactor coupled to the moving assembly 40 is also rotated downward so as not to interfere with the moving truck 170 for the circuit breaker. A ground line is not connected when the general moving truck 170 enters.

In a grounding device for a circuit breaker according to one embodiment of the present disclosure, a connection of a ground line is made by a contact between a movable contactor and a fixed contactor, which can improve contact pressure to endure a high breaking current.

A ground truck merely has an operation hole for avoiding a lever or roller of the grounding device, which can reduce a size of an avoidance hole.

A main part of the grounding device is not installed on the ground truck, but is installed on a distribution box or enclosure, thereby reducing a space occupied by the ground truck.

Connection and disconnection of the ground line is automatically performed according to the moving truck for the circuit breaker and the ground truck that are drawn in and out of the distribution box.

While the invention has been shown and described with reference to the foregoing preferred embodiments thereof, it will be understood by those skilled in the art that various changes and modifications may be made without departing from the scope of the invention as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present disclosure should be construed according to the appended claims, and all technical ideas within the scope of equivalents thereof should be construed as being included in the scope of the present disclosure.

The invention claimed is:

1. A grounding device for a circuit breaker, the device comprising:
    a housing installed in a distribution box or an enclosure;
    a fixed contactor fixed to a ground truck that is drawn into and out of the distribution box or the enclosure;
    a moving assembly rotatably installed on the housing;
    a movable contactor coupled to the moving assembly to move together, and having one end connected to ground and another end connected to or separated from the fixed contactor; and
    a stopper assembly rotatably installed on the housing to restrict or allow an operation of the moving assembly,
    wherein the ground truck includes on a lower surface thereof a mover entry hole having a length from a rear end to a middle portion in a front and rear direction, and an operation prevention hole formed parallel to the mover entry hole.

2. The grounding device of claim 1, wherein the mover entry hole is arranged to correspond to a position of the fixed contactor in a perpendicular direction when the ground truck enters an inside of the distribution box, and
    wherein the operation prevention hole is arranged to correspond to positions of the stopper assembly and the moving assembly in the perpendicular direction when the ground truck enters the inside of the distribution box.

3. The grounding device of claim 1, wherein the ground truck includes a ground body and a moving truck that is movable while loading the ground body, and
    wherein the fixed contactor is installed on the ground body or the moving truck.

4. The grounding device of claim 3, wherein the fixed contactor comprises:
    a holder fixedly installed on the ground truck;
    a plurality of contactors arranged in two rows on the holder with a predetermined gap therebetween; and
    a stator clip supporting the plurality of contactors in a surrounding manner.

5. The grounding device of claim 1, further comprising a fixing bracket which is fixed to the distribution box or enclosure and to which the housing is coupled.

6. The grounding device of claim 5, wherein the fixing bracket includes a first operation hole through which the moving assembly is movable, and a second operation hole through which the stopper assembly is movable.

7. The grounding device of claim 6, wherein the fixing bracket further includes a third operation hole through which the movable contactor is movable.

8. The grounding device of claim 6, wherein the housing includes a fourth operation hole and a fifth operation hole formed through a central surface thereof to communicate with the first operation hole and the second operation hole.

9. The grounding device of claim 6, wherein the moving assembly comprises:
    a moving plate;
    a first shaft coupled through the moving plate; and
    a first lever formed on a portion of the moving plate and protruding to a top of the fixing bracket through the first operation hole.

10. The grounding device of claim 9, wherein the moving assembly further comprises a fixing plate which is provided on one side of the first shaft and to which the movable contactor is coupled.

11. The grounding device of claim 9, wherein a first roller is disposed on an end portion of the first lever.

12. The grounding device of claim 9, wherein a landing portion with which the stopper assembly is contactable is formed on a lower end of the moving plate.

13. The grounding device of claim 9, wherein the stopper assembly comprises:
- a stopper plate;
- a second shaft coupled through the stopper plate; and
- a second lever formed on a portion of the stopper plate and protruding from a top of the fixing bracket through the second operation hole.

14. The grounding device of claim 13, wherein a second roller is disposed on an end portion of the second lever.

15. The grounding device of claim 13, wherein a pressing portion which is to be brought into contact with the moving assembly is formed on a lower end of the stopper plate.

16. The grounding device of claim 13, further comprising a first return spring having one end supported by a first spring fixing portion formed on the first shaft and another end supported by a second spring supporting portion formed on the stopper plate.

17. The grounding device of claim 16, further comprising a second return spring having one end supported by a second spring fixing portion formed on the second shaft and another end supported by a first spring supporting portion formed on the first lever.

18. The grounding device of claim 1, further comprising a support plate coupled to a side surface of the housing to support the moving assembly and the stopper assembly.

19. The grounding device of claim 1, wherein the movable contactor is connected to the ground by a flexible connection line.

20. A grounding device for a circuit breaker, the device comprising:
- a stator assembly installed on a ground truck; and
- a mover assembly installed on a distribution box or an enclosure to be brought into contact with the stator assembly, wherein the mover assembly comprises:
- a housing installed on the distribution box or the enclosure;
- a moving assembly rotatably installed on the housing;
- a movable contactor coupled to the moving assembly to move together, and having one end connected to ground and another end connected to or separated from the stator assembly; and
- a stopper assembly rotatably installed on the housing to restrict or permit an operation of the moving assembly, wherein the ground truck includes on a lower surface thereof a mover entry hole having a length from a rear end to a middle portion in a front and rear direction, and an operation prevention hole formed parallel to the mover entry hole.

* * * * *